United States Patent [19]

Katayama et al.

[11] Patent Number: 5,290,503
[45] Date of Patent: Mar. 1, 1994

[54] METHOD AND APPARATUS FOR INSERTING A GREEN TIRE IN A VULCANIZING MACHINE

[75] Inventors: Hideaki Katayama; Toshifumi Murakami; Akira Hasegawa; Katsuyoshi Sakaguchi, all of Nagasaki; Koji Soeda, Kobe; Yoshiya Kubota, Toyota; Akinori Kubota, Kobe; Masaaki Ijiri, Aichi, all of Japan

[73] Assignees: Mitsubishi Jukogyo Kabushiki Kaisha, Tokyo; Sumitomo Rubber Industries Ltd., Hyogo, both of Japan

[21] Appl. No.: 445,952

[22] Filed: Dec. 8, 1989

[30] Foreign Application Priority Data

Jan. 31, 1989 [JP] Japan .................................. 1-19869

[51] Int. Cl.⁵ .............................................. B29C 35/00
[52] U.S. Cl. .................................... 264/326; 425/36; 425/38; 264/315
[58] Field of Search ............... 425/28.1, 36, 38; 264/315, 326

[56] References Cited

U.S. PATENT DOCUMENTS

| | | | |
|---|---|---|---|
| 2,997,738 | 8/1961 | Soderquist | 264/315 |
| 3,471,895 | 10/1969 | Ulm et al. | 264/315 |
| 3,530,533 | 9/1970 | Turk et al. | 425/38 |
| 4,045,150 | 8/1977 | Gazuit | 425/36 |
| 4,190,406 | 2/1980 | Geck et al. | 425/38 |
| 4,236,883 | 12/1980 | Turk et al. | 425/36 |
| 4,474,399 | 10/1984 | Lauber | 425/38 |
| 4,871,305 | 10/1989 | Galigani | 425/36 |

FOREIGN PATENT DOCUMENTS 2176503 11/1973 France .
1177617 1/1970 United Kingdom .

*Primary Examiner*—Jeffery Thurlow
*Assistant Examiner*—Mathieu Vargot
*Attorney, Agent, or Firm*—Wenderoth, Lind & Ponack

[57] ABSTRACT

After loading a green tire in a tire vulcanizing machine and before shaping, bead portions of the green tires are centered relative to bead rings of upper and lower metal molds and are sequentially inserted into the bead rings precisely in parallel thereto by the same extendable/retractable sectors and chucks which are movable vertically. An apparatus preferable for practicing the aforementioned method includes a plurality of such sectors for centering and holding a bead portion of the green tire, slide and linkage mechanisms for extending and retracting chucks to which the sectors are mounted, and a cylinder mechanism for vertically moving the chucks so as to insert the bead portion of the green tire centered and held by the sectors into a bead ring of a tire metal mold.

4 Claims, 14 Drawing Sheets

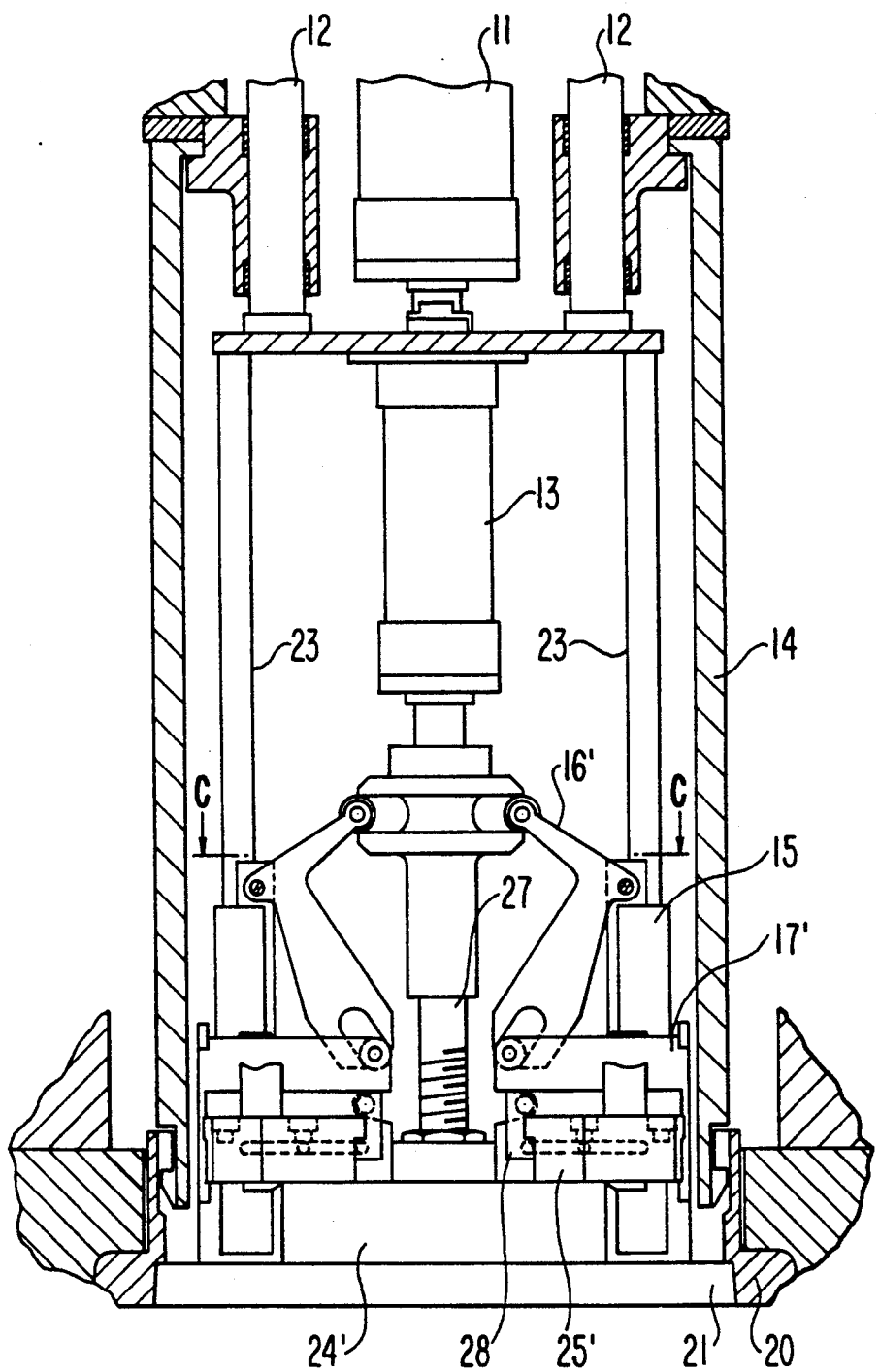

METHOD AND APPARATUS FOR INSERTING A GREEN TIRE IN A VULCANIZING MACHINE

BACKGROUND OF THE INVENTION

1. Field of the Invention

The present invention relates to a method and an apparatus for expanding bead portions of a green tire and sequentially inserting the upper and lower bead portions into bead rings of upper and lower metal molds before tire shaping is carried out in a tire vulcanizing machine.

2. Description of the Prior Art

The heretofore known apparatus consists of upper and lower metal molds disposed in a vulcanizing machine and adapted to move up and down relative to each other and a center mechanism disposed in the lower metal mold. When precisely centering a green tire with respect to bead ring portions of the upper and lower metal molds, the green tire is first transported to the metal molds by means of a . loader, and is then set at an upper metal mold bead ring portion or at a lower metal mold bead ring portion. With such an apparatus in the prior art, only an upper or lower bead portion of the green tire is set at the bead ring portion of the corresponding metal mold, and the remaining lower or upper bead portion of the green tire cannot be set precisely at the bead ring portion of the corresponding metal mold. In addition, if the green tire should have been deformed before it is transported by the loader, the green tire could not be set precisely at the metal mold bead ring portion, and the deformation would have an adverse effect on the uniformity of the vulcanized tire.

In the prior art, after a green tire is loaded in upper and lower molds of a tire vulcanizing machine, a shaping operation is carried out upon vulcanization of the tire. In the shaping operation, a bladder is pressed against the inside of the green tire under pressure, and the bead portions of the green tire are forcibly pushed into upper and lower bead rings of the metal molds by the bladder.

Therefore, there is a possibility that vulcanization of a tire may be carried out without the green tire bead portions being surely inserted into the bead rings of the metal molds.

SUMMARY OF THE INVENTION

It is accordingly one object of the present invention to provide improved method and apparatus for inserting a upper and lower bead portions of the green tire can be set precisely at the upper and lower metal mold bead rings in a reliable manner.

According to one feature of the present invention, there is provided a method for inserting a green tire in a tire vulcanizing machine, consisting of the steps of centering relative to a bead ring and holding a bead portion on one side of a green tire by means of extendable and retractable chucks having sectors mounted thereto, then inserting the bead portion into and parallel to a bead ring of one tire metal mold by means of the chucks which are supported in a vertically movable manner, and subsequently repeating the aforementioned holding step and the aforementioned inserting step for the bead portion on the other side of the green tire and the other metal mold by means of the same sectors and chucks.

According to another feature of the present invention, there is provided an apparatus for inserting a green tire in a tire vulcanizing machine, comprising a plurality of chucks having sectors mounted thereto for centering and holding a bead portion of the green tire, and slide and linkage means for selectively extending and retracting the aforementioned chucks. The chucks are vertically movable for inserting the bead portion of the green tire centered and held by the above-described sectors into a bead ring of a tire metal mold.

According to still another feature of the present invention, there is provided the above-featured apparatus for inserting a green tire in a tire vulcanizing machine, wherein the sectors are mounted to the chucks via springs so as to be displaceable in the vertical direction.

According to yet another feature of the present invention, there is provided the last-featured apparatus for inserting a green tire in a tire vulcanizing machine, which further comprises a chuck opening/closing cylinder, and a linkage connected to the chuck opening/closing cylinder for selectively extending and retracting the aforementioned chucks and sectors.

More particularly, the apparatus according to the present invention has sectors that are respectively mounted to a plurality of chucks adapted to be extended or retracted in a concentric manner by a cylinder and links, and the sectors can center a bead portion of a green tire relative to a bead ring when in extended positions. In addition, the sectors are mounted to the respective chucks in a vertically displaceable manner by means of springs, and an elevator cylinder for raising and lowering the entire assembly of the sectors and chucks, is provided.

The operation of forcibly inserting a green tire into metal mold bead rings is effected in the following manner. That is, when the elevator cylinder raises the assembly with the upper bead portion of the green tire centered relative to the bead ring by means of the sectors, the sectors will strike against the upper portion of the upper metal mold bead ring and retract, and the bead portion of the green tire will be inserted into the bead ring as pushed by the tip ends of the chucks. Such an operation is similarly effected for the lower bead portion of the green tire and the bead ring of the lower metal mold. Namely, as a result of the lowering of the assembly by the elevator cylinder, the lower bead portion of the green tire is inserted into the bead ring of the lower metal mold as pushed by the tip ends of the chucks.

Thus, according to the present invention, upper and lower bead portions of a green tire can be inserted sequentially into the upper metal bead ring and the lower metal mold bead ring, respectively, by means of a single mechanism, and thereby the structure of the apparatus for inserting a green tire in a tire vulcanizing machine is relatively simple.

The above-mentioned and other objects, features and advantages of the present invention will become more apparent by referring to the following description of preferred embodiments of the invention taken in conjunction with the accompanying drawings.

BRIEF DESCRIPTION OF THE DRAWINGS

In the accompanying drawings:

FIG. 3 is a longitudinal cross-sectional view similar to FIG. 1 of another preferred embodiment of the apparatus according to the present invention;

FIGS. 8-1 through 8-7 are schematic diagrams showing the successive steps of the operation of a bead lock mechanism.

DETAILED DESCRIPTION OF THE PREFERRED EMBODIMENTS

Figure 1:
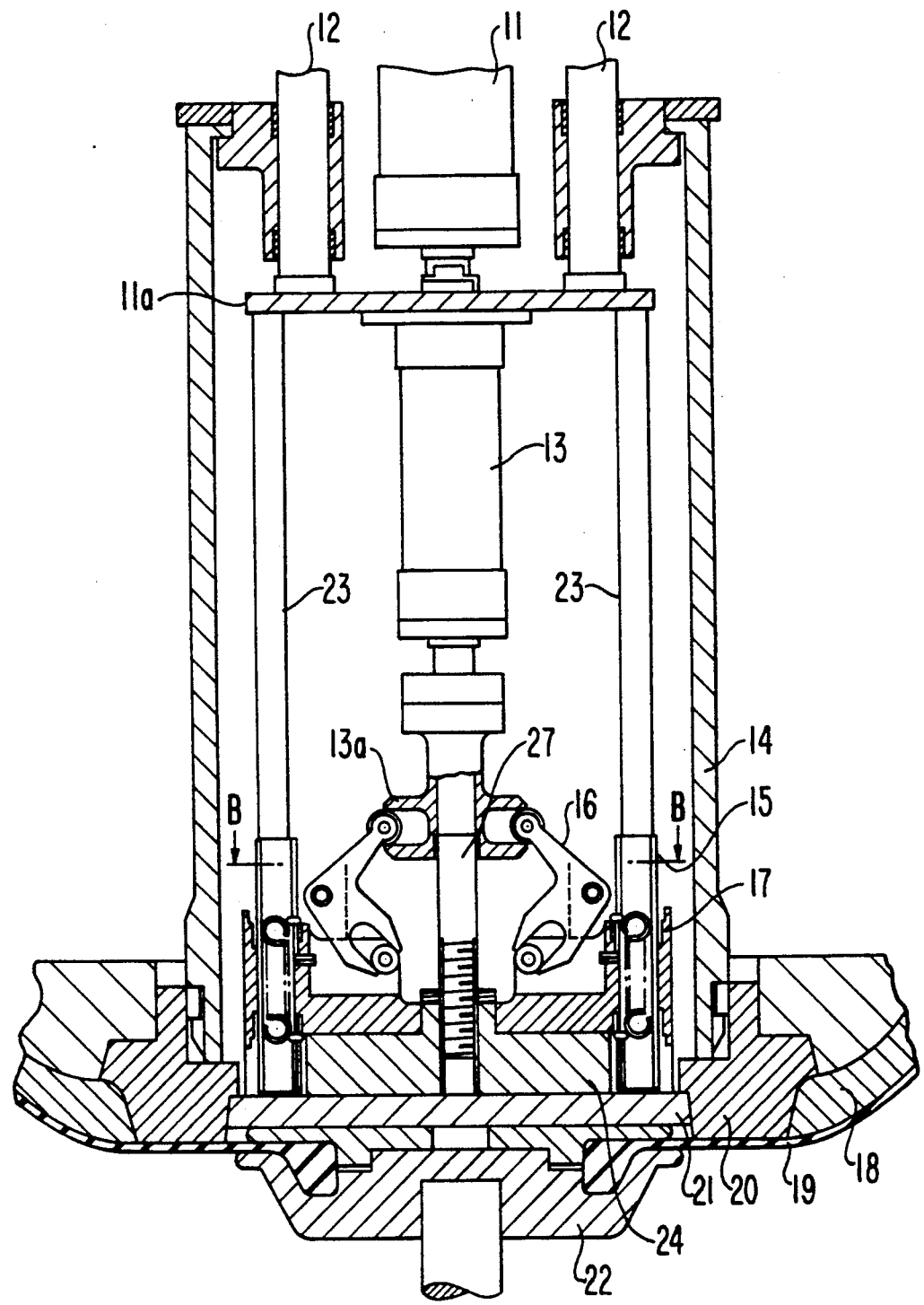
FIG. 1 is a longitudinal cross-sectional view of an essential part of one preferred embodiment of the apparatus according to the present invention, taken along line A—A in FIG. 5.

Referring now to FIGS. 1 through 8, reference numeral 1 designates hydraulic cylinders, numeral 2 designates a main body frame, numeral 3 designates a pressing hydraulic cylinder, numeral 4 designates a pressing column, numeral 5 designates guide brackets, numeral 6 designates a bolster plate, numeral 7 designates a heat plate, numeral 8 designates a tire metal mold, numeral 9 designates a center mechanism, numeral 10 designates installation stands, numeral 11 designates a bead lock elevator cylinder, numeral 12 designates guide rods, numeral 13 designates a chuck opening/closing cylinder, numeral 14 designates an outer tube, numeral 15 designates sectors, numerals 16 and 16' designate links, numerals 17 and 17' designate chucks, numeral 18 designates a vulcanized tire, numeral 19 designates a bladder, numeral 20 designates an upper bead ring, numeral 20a designates an upper bead, numeral 21 designates an inner pressure reaction force receiver plate, numeral 22 designates a center post, numeral 23 designates tie rods, numerals 24 and 24' designate guide plates, numerals 25 and 25' designate guide brackets, numeral 26 designates pins, numeral 27 designates a stopper bolt, numeral 28 designates an intermediate slide plate, numeral 29 designates metal spring suspender fixtures, numeral 30 designates springs, numeral 31 designates a green tire, numeral 32 designates a lower bead ring, and numeral 32a designates a lower bead.

Figure 5:
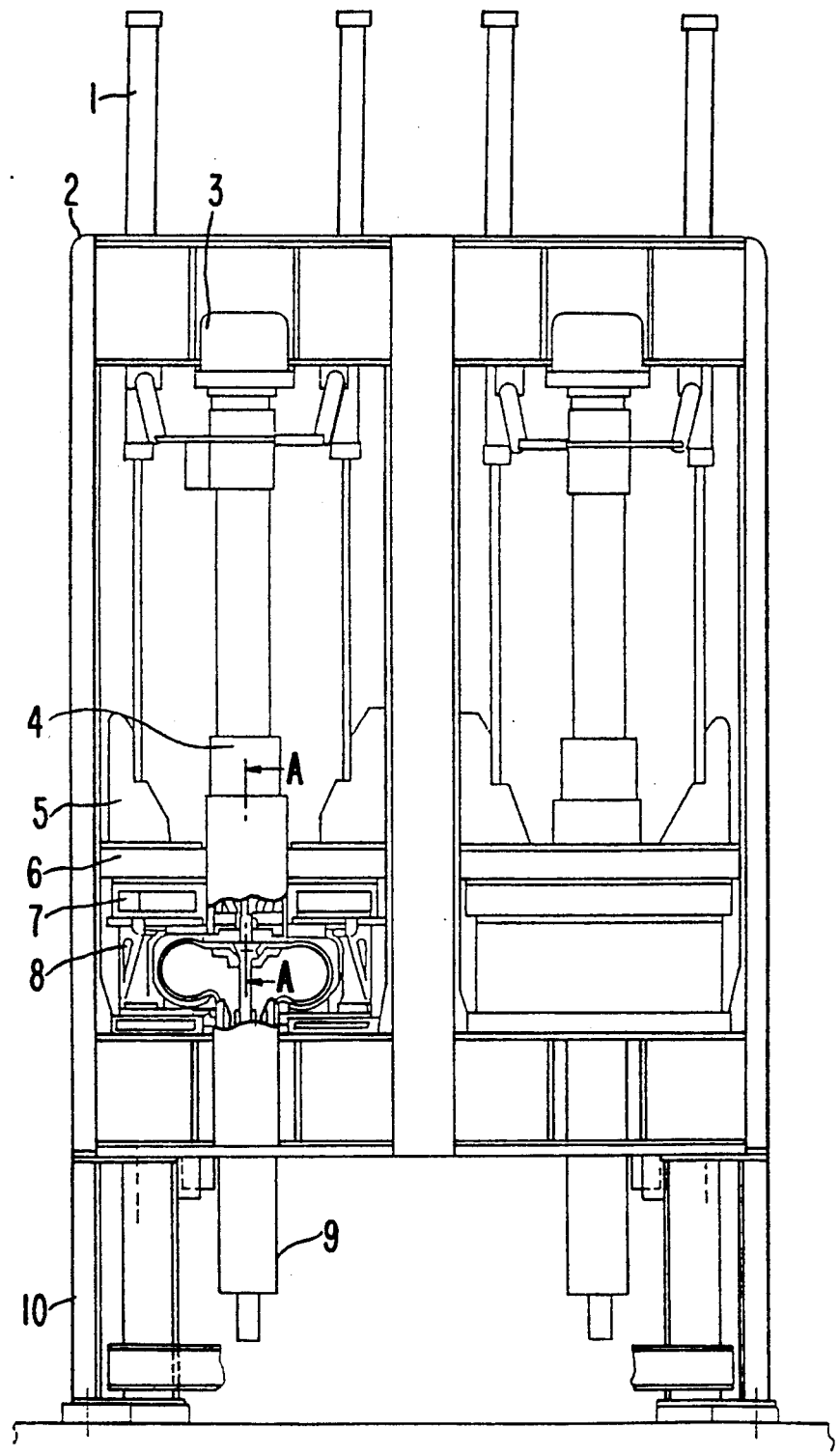
FIG. 5 is a general front view partly in section of a tire vulcanizing machine.

In the general front front view of FIG. 5, a hydraulic vulcanizing machine has its main body frame 2 supported on the installation stands 10, and the bolster plate 6 in the machine is raised and lowered by means of the two hydraulic cylinders 1. To this bolster plate 6 are fixedly secured the heat plate 7 and the metal mold 8. The raising and lowering of the bolster plate 6, as guided by the guide brackets 5 along rails mounted to the frame 2, can be repeated. Vulcanization of a green tire is effected by pressing the pressing column 4, fixed to the bolster plate 6 at its center, downwardly by means of the single pressing hydraulic cylinder 3, and by generating heat and pressure within the bladder 19 mounted to the lower centering mechanism 9.

FIG. 1 is a cross-sectional view taken along line A—A in FIG. 5, and shows a bead lock mechanism assembled within the pressing column 4. The outer tube 14 is fixed to the pressing column 4, and the elevator cylinder 11 is mounted within the pressing column 4. The guide rods 12 act as a guide during the raising and lowering operations carried out by the elevator cylinder 11, and the guide plate 24 is supported by the elevator cylinder 11 and the six tie rods 23 mounted to a plate 11a at the bottoms of the guide rods 12.

Figures 1, 8:
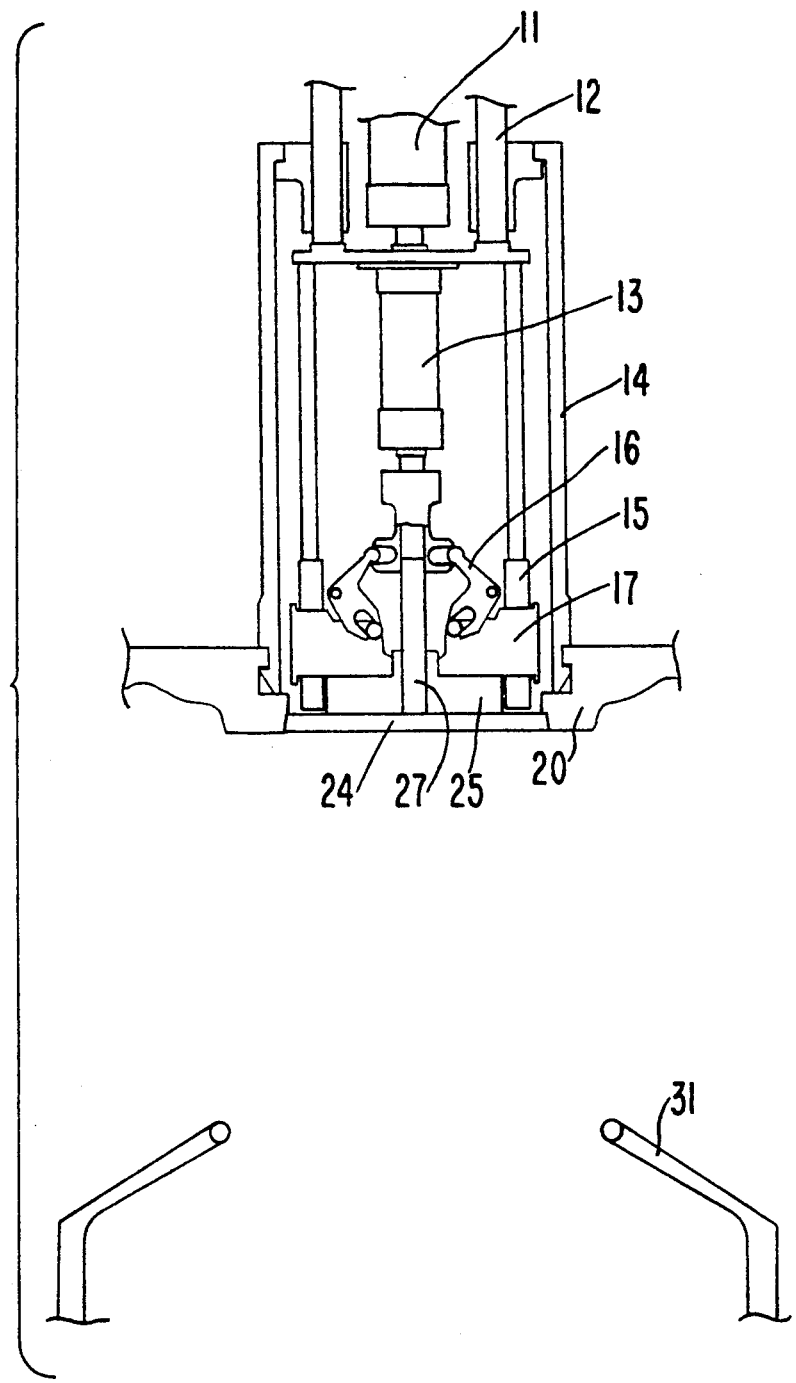
Figures 2, 8:
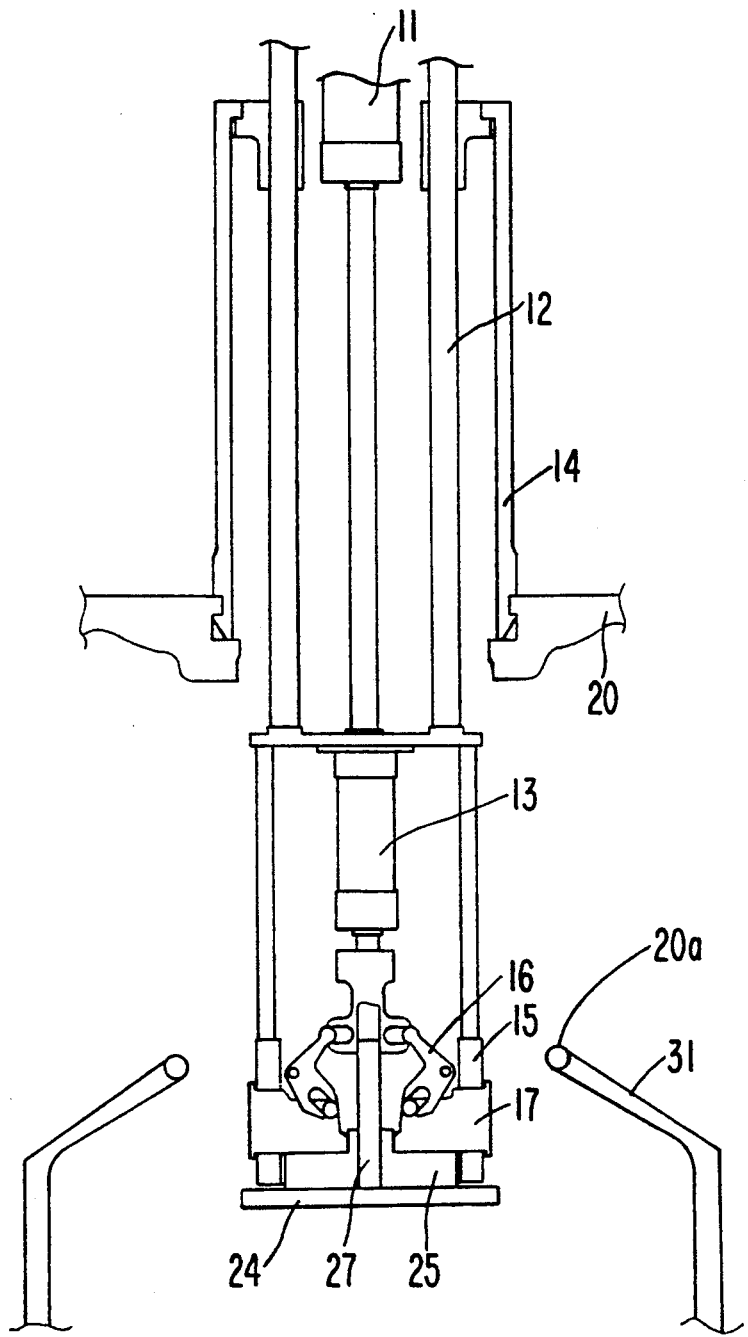
Figures 3, 8:
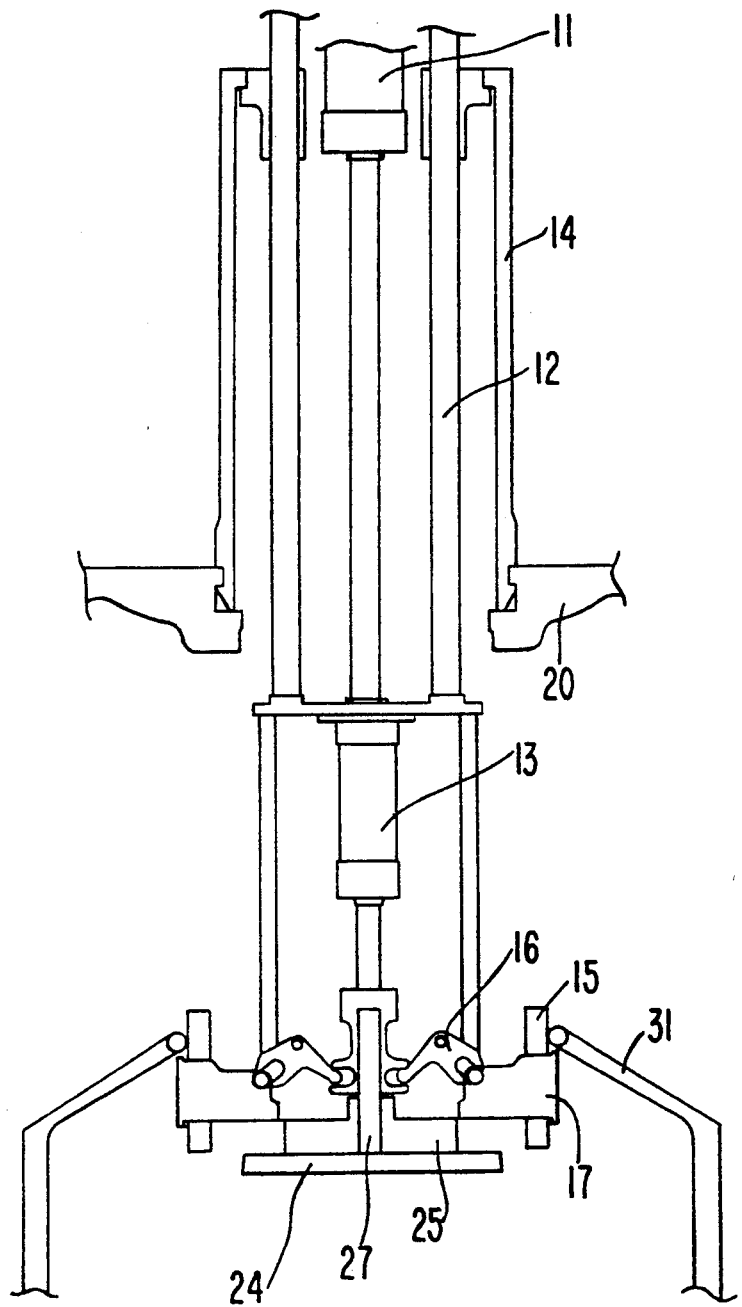
Figures 4, 8:
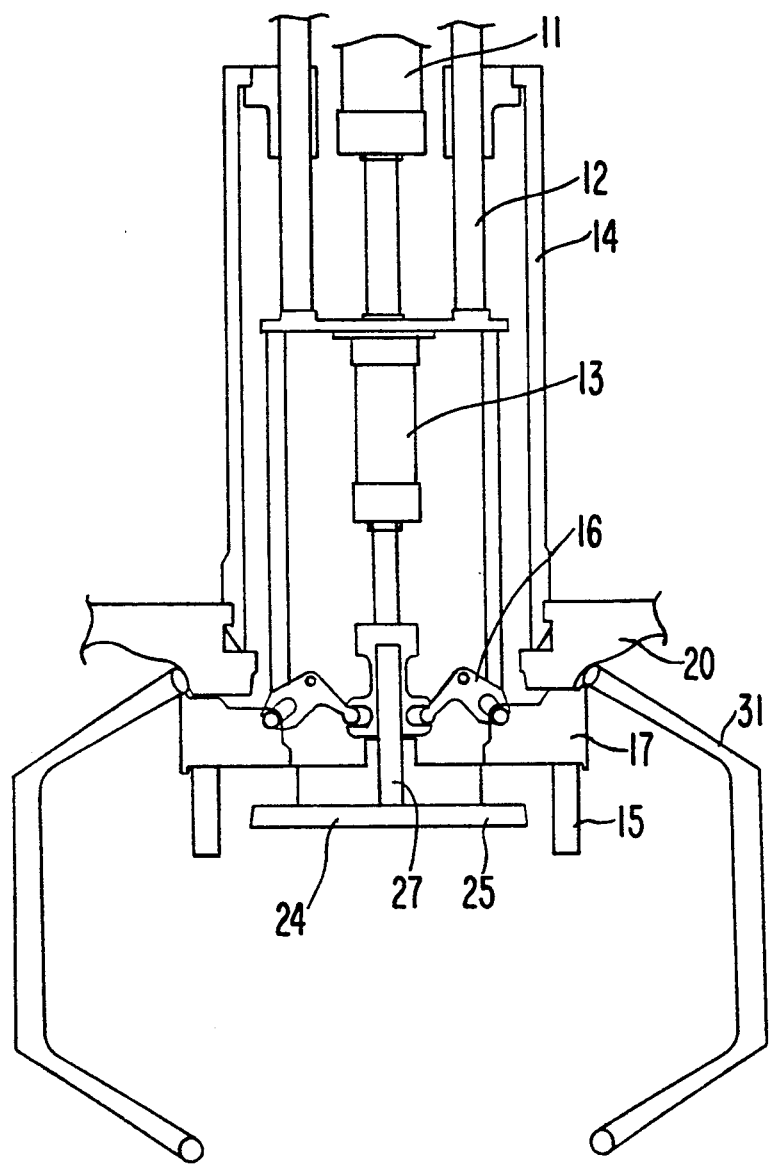
Figures 5, 8:
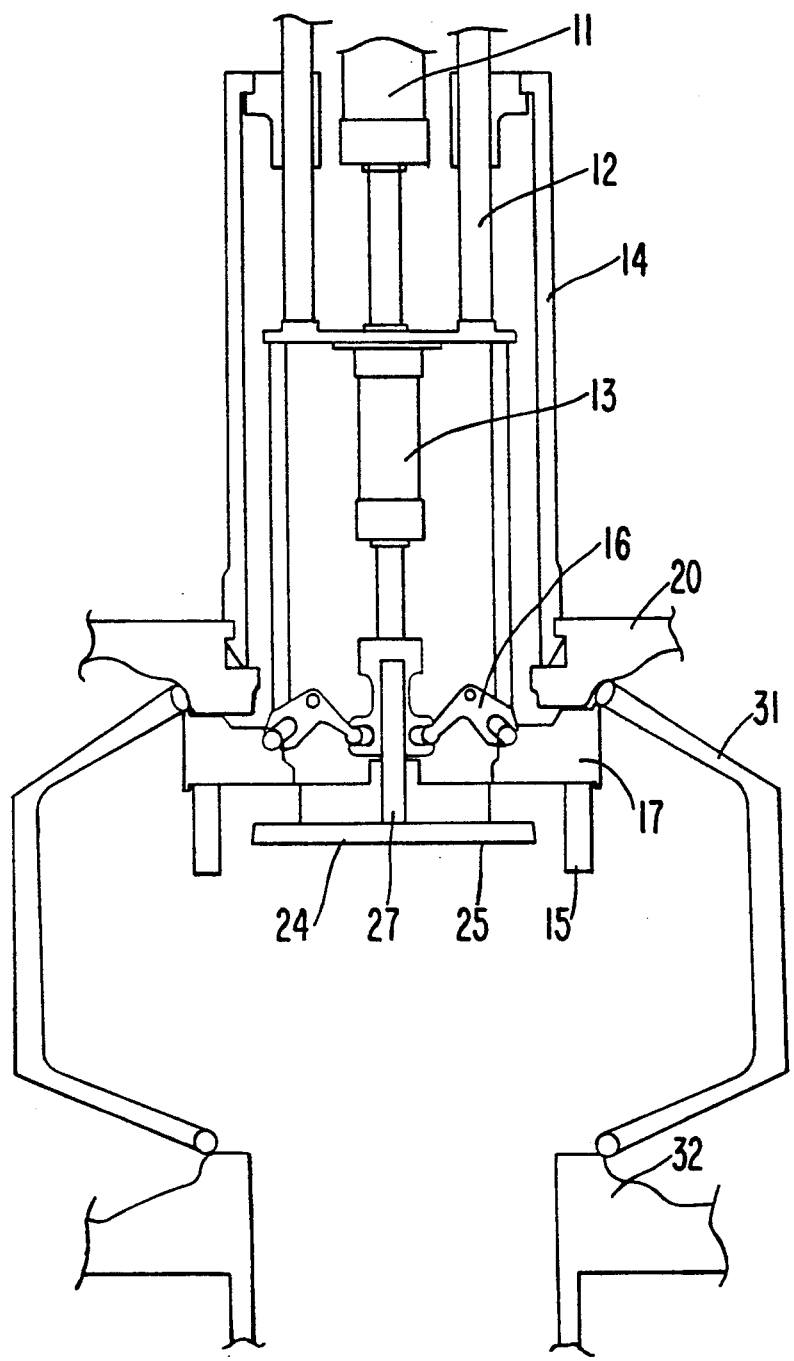
Figures 6, 8:
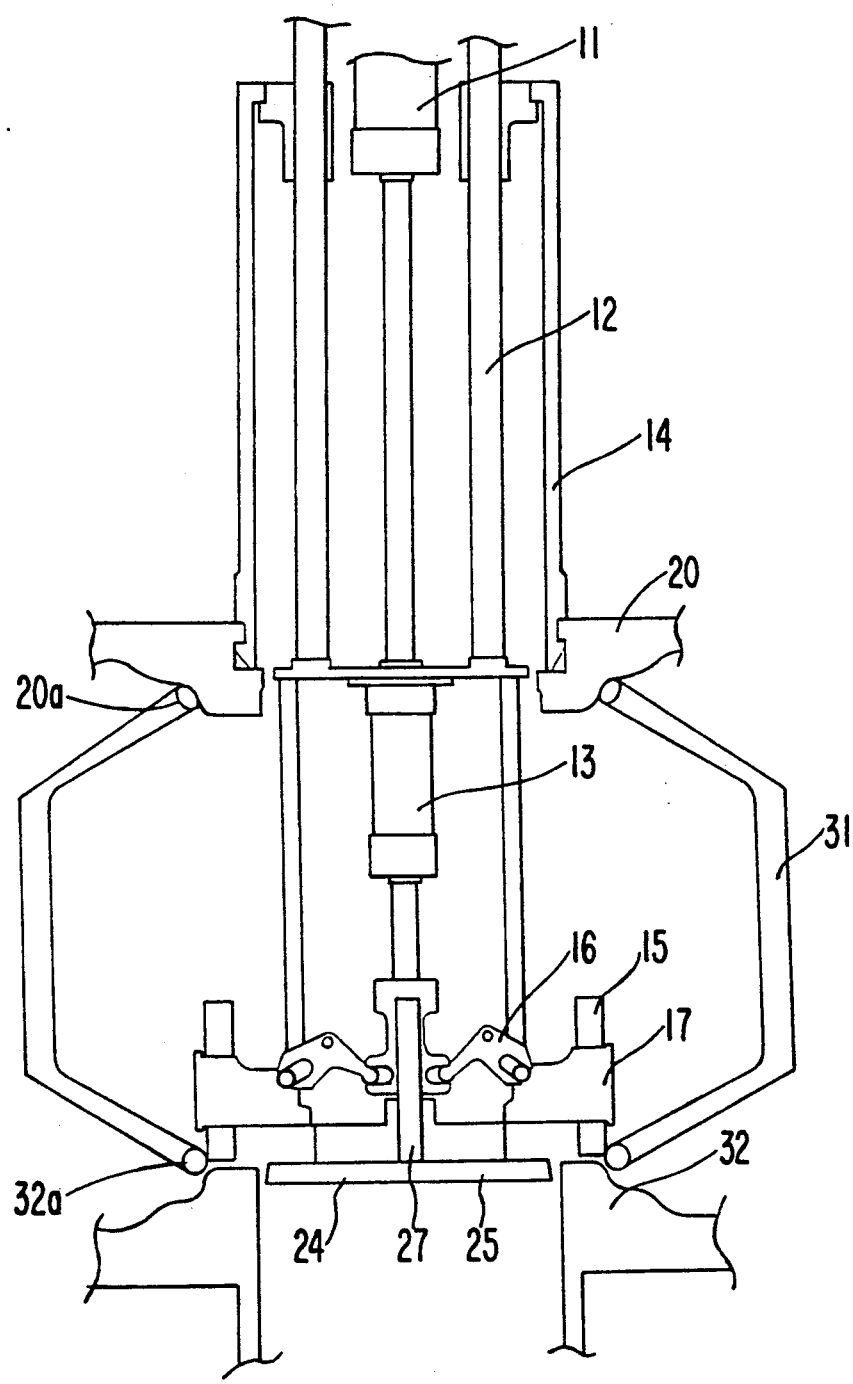
Figures 7, 8:
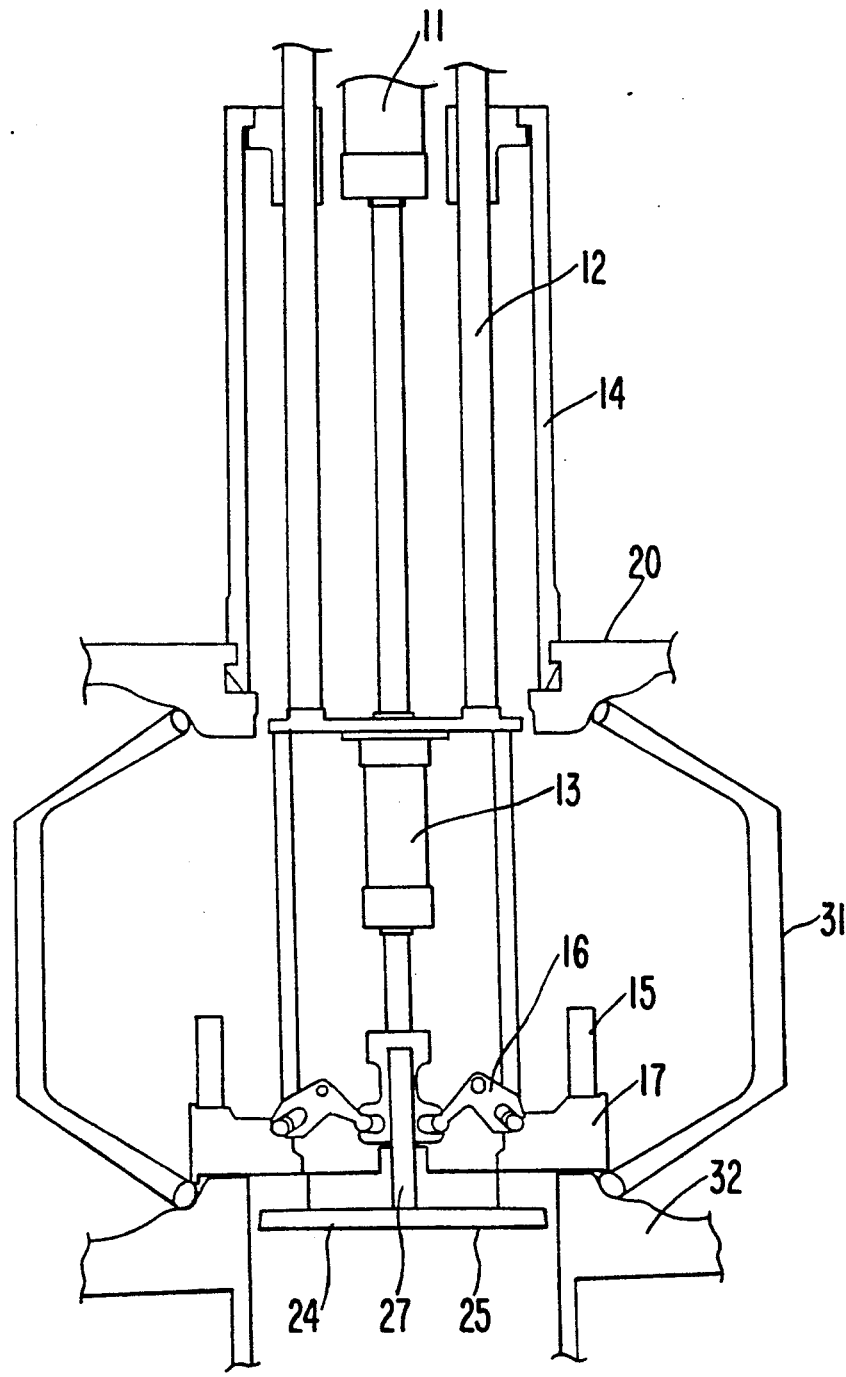

Each of the chucks 17 supported on the guide plate 24 has a hollow sector 15 slidably supported in a through-hole 17a extending in the vertical direction therethrough by spring 30 provided within the same sector 15 as shown in FIGS. 6 and 7. The chucks 17 can be slid on the guide plate 24 by the chuck opening/closing cylinder 13 via a link 16, which results in the opening or closing of the chucks 17. The extent of opening of the chucks 17 can be adjusted by changing the position of the inner pressure reaction force receiver plate 21 mounted to the slide plate 24 by adjusting the stopper bolt 27. The above-mentioned spring 30 has its opposite ends mounted to the metal spring suspender fixtures 29, 29 inserted in slots 15a, 15a formed in the upper and lower portions, respectively, of the sector 15, and these metal spring suspender fixtures 29, 29 are adapted to be brought into contact with the upper and lower surfaces of the chuck 17 (See FIGS. 6 and 7.).

FIG. 1 shows a tire vulcanizing state in which the bladder 19 is positioned inside of the vulcanized tire 18. The bladder 19 is held by the center post 22 of the center mechanism 9, and to the outside of the vulcanized tire 19 is disposed the tire metal mold 8.

Figure 2:
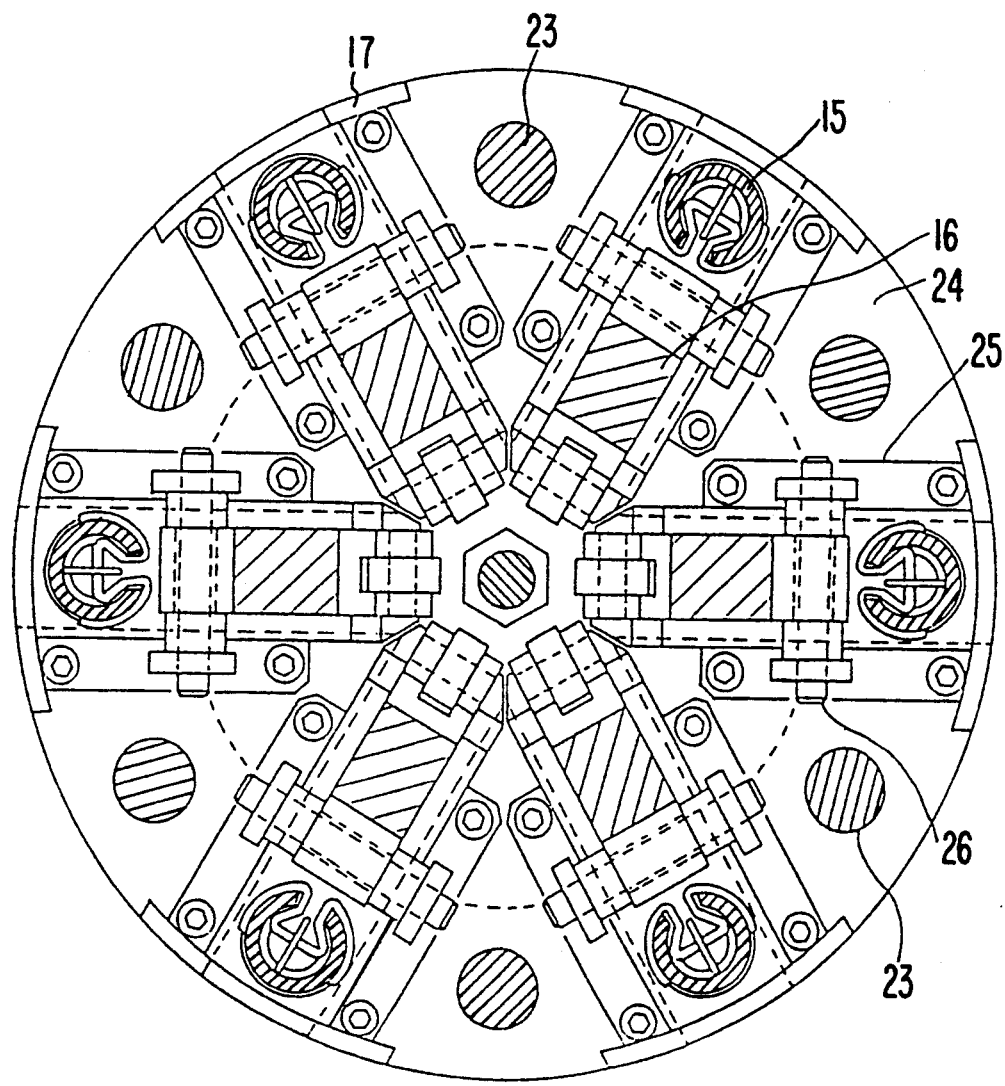
FIG. 2 is a transverse cross-sectional view taken along line B—B in FIG. 1.

FIG. 2 shows a cross section of the bead lock mechanism taken along line B—B in FIG. 1.

In this figure, on the guide plate 24 are provided six sets of chucks 17 and sectors 15 as arrayed radially at equal angular intervals, and a center of rotation of an L-shaped link 16 is defined by a pin 26 supported by the guide bracket 25 fixedly secured to the guide plate 24. As shown in FIG. 1, one end of this link 16 is slidably inserted into a link receiver 13a disposed at the bottom of the chuck opening/closing cylinder 13, and the other end of the link 16 is forked and engaged with a pin 40 provided on the chuck 17.

The modified embodiment shown in FIG. 3 is similar to the first embodiment shown in FIG. 1, but in this embodiment an intermediate slide plate 28 is provided in order to increase the extent of expansion of the chucks 17', and as a result the links 16' corresponding to the links 16 are comparatively large.

Figure 4:
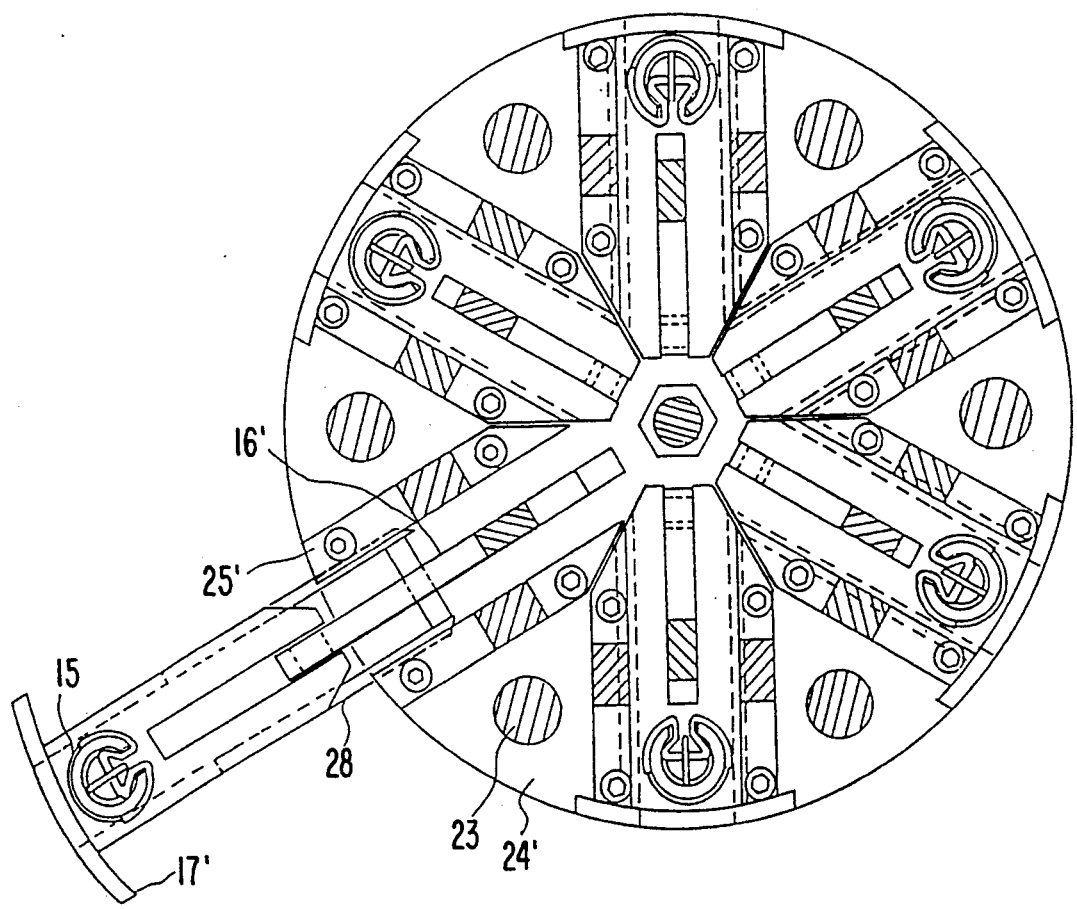
FIG. 4 is a transverse cross-sectional view taken along line C—C in FIG. 3.

FIG. 4 shows a transverse cross section of the bead lock mechanism taken along line C—C in FIG. 3.

While FIG. 4 is similar to FIG. 2, owing to the presence of the intermediate slide plate 28, even if the block of the chuck 17' should move toward the outside of the slide plate 24', it would be held by the intermediate slide plate 28. Accordingly, the stroke of opening/closing of the chuck 17' becomes large, and the apparatus can be adapted to a wide range of tire sizes.

Figure 6A:
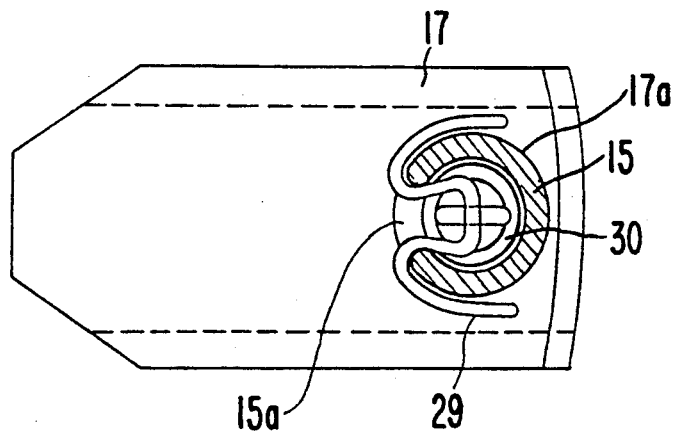
FIG. 6(a) is a plan view of one sector and a chuck portion.
Figure 6B:
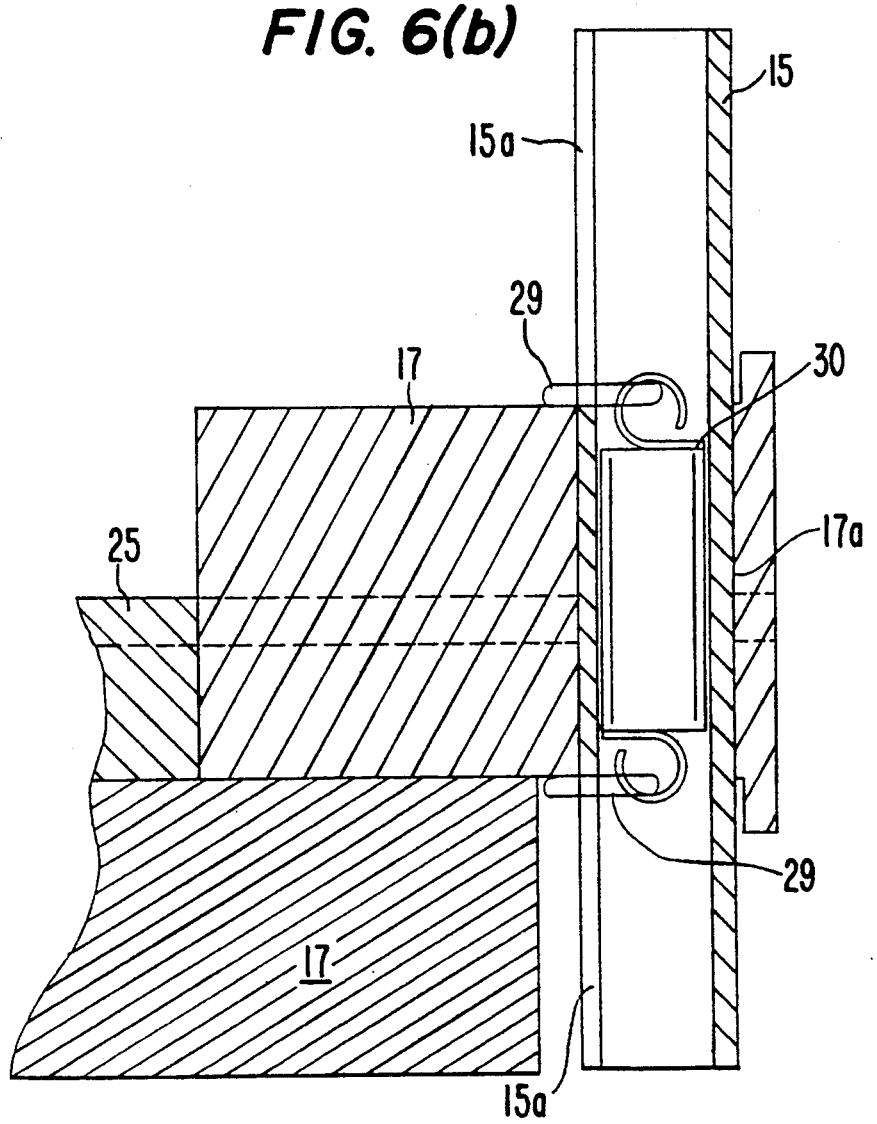
FIG. 6(b) is a cross-sectional side view of the sector and chuck portion shown in FIG. 6(a)

FIGS. 6(a) and 6(b) show the details of the part of the sector 15 held by the chuck 17. The sector 15 is held at a neutral position with respect to the chuck 17 by means of the spring 30 mounted to two metal spring suspender fixtures 29, 29 which are held in contact with the chuck above and below the upper and lower surfaces thereof, respectively.

Figure 7A:
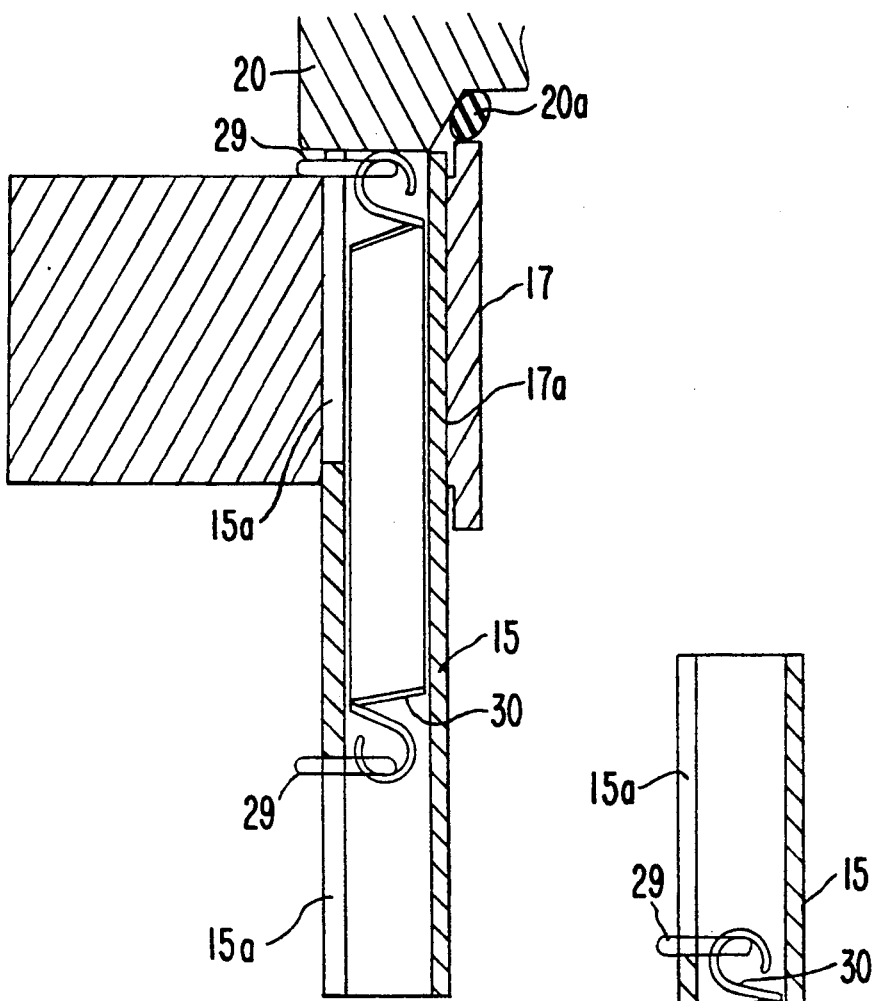
FIG. 7(a) is a view similar to FIG. 6(b) showing the state where an upper bead has been forcibly inserted into an upper bead ring.
Figure 7B:
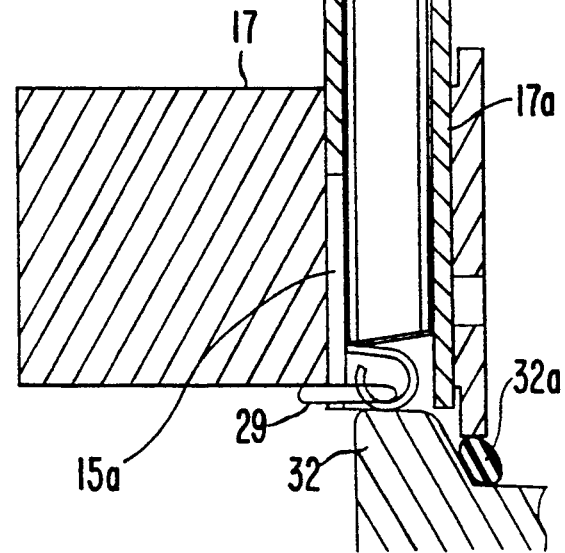
FIG. 7(b) is another view similar to FIG. 6(b) but showing the state where a lower bead has been forcibly inserted into a lower bead ring.

The actuation of the sector 15 and the spring 30 will be described with reference to FIGS. 7(a) and 7(b).

When the bead lock elevator cylinder 11 raises the assembly of chuck 17 and sectors 15, the chuck 17 and the sector 15 are raised, and the top end of the sector 15 comes into contact with the lower surface of the upper bead ring 20. In this state, the upper bead 20a of the green tire 31 is held by the sector 15 as will be described later. When the bead lock elevator cylinder raises the assembly further, the sector 15 does not rise, but the chuck 17 rises while stretching the spring 30. Hence, the upper bead 20a of the green tire 31 is pushed up by the chuck 17, and thus into the upper bead ring 20. Likewise, the lower bead 32a of the green tire 31 is also inserted into the lower bead ring 32 by the lowering of the assembly of chuck 17 and sectors 15 by the bead lock elevator cylinder 11.

The successive steps of the operation of the bead lock mechanism are shown in FIGS. 8-1 through 8-7, respectively.

FIG. 8-1 shows the state where the green tire 31 has been positioned right under the bead lock mechanism by means of an externally seizing loader not shown, and in this state the chucks 17 have been retracted as they have been pulled up by the bead lock elevator cylinder 11 and are accommodated within the outer tube 14.

FIG. 8-2 shows the state where the chucks 17 and the sectors 15 have been lowered by the bead lock elevator cylinder 11 to a position where the level of the sectors 15 coincides with the level of the upper bead 20a of the green tire 31, and have been stopped there.

FIG. 8-3 shows the state where the six sets of chucks 17 and sectors 15 have been moved radially outwardly by the downward opening operation of the chuck opening/closing cylinder 13 and the links 16, and the upper bead 20a of the green tire 31 has been centered relative to the upper bead ring and held by the outside of the sectors 15.

FIG. 8-4 shows the state where the bead 20a of the green tire 31 centered in the state shown in FIG. 8-3 has been pulled up by the bead lock elevator cylinder 11 and has been inserted into the upper bead ring 20 by the tip ends of tire 31 can be surely set in the upper bead ring 20.

FIG. 8-5 shows the state where while the upper bead 20a of the green tire 31 is kept inserted in the upper bead ring 20, the lower bead 32a of the green tire 31 has been butted against the lower bead ring 32 as a result of the lowering of the upper mold by press elevator cylinder 1 shown in FIG. 5. The lowering of the upper mold by the press elevator cylinder 1 is stopped once the FIG. 8-5 state is achieved.

In FIG. 8-6, the lowering of the upper mold by the press elevator cylinder 1 has been stopped, and the chucks have been lowered by the bead lock elevator cylinder 11. After a retraction operation of the chucks 17 was carried out in the midst of the lowering thereof, the sectors 15 are positioned above the lower bead ring 32. At this position, the lower bead 32a of the green tire 31 is centered relative to the lower bead ring by the sectors 15 moved radially outward by the chucks 17. This centering operation is similar to that described previously with reference to FIG. 8-3.

FIG. 8-7 shows the state where the lower bead 32a of the green tire 31 is being pushed into the lower bead ring 32 by the tip ends of the chucks 17 as a result of the lowering of the plate 11a by the bead lock elevator cylinder 11. After this operation, the plate 11a is lifted by the bead lock elevator cylinder 11 and the chucks 17 are closed. Thus, the state shown in FIG. 8-1 is achieved, in which the bead lock mechanism is accommodated within the outer tube 14.

After the upper and lower beads 20a and 32a of the green tire 31 have been surely inserted into the upper and lower bead rings 20 and 32, respectively, in the above-described manner, the shaping and vulcanization of the green tire are carried out.

Owing to the provision of a plurality of sectors for centering and holding a bead portion of a green tire, slide and linkage means for performing extension/retraction operations of the chucks to which the sectors are mounted, and means for moving the chucks vertically for inserting the bead portion of the green tire centered and held by the sectors into a bead ring of a tire metal mold, the method and apparatus for inserting a green tire in a tire vulcanizing machine according to the present invention provides the following advantages.

That is, thanks to the fact that vulcanization of a green tire is carried out after the upper and lower beads of the green tire have been mechanically surely inserted into the upper and lower bead rings of the metal molds, the quality of vulcanized tires can be improved. In addition, as a result of the fact that the upper and lower beads of a green tire are sequentially inserted into the upper bead ring and into the lower bead ring by means of a single mechanism, the structure of the apparatus is relatively simple.

Since many changes and modifications can be made to the above-described structure without departing from the spirit of the present invention, all matter contained in the above description and illustrated in the accompanying drawings shall be interpreted to be illustrative of and not a limitation on the present invention as defined in the appended claims.

What is claimed is:

1. A method of inserting a green tire in a vulcanizing machine having an upper mold portion including an upper bead ring and a lower mold portion including a lower bead ring, said method comprising:

positioning a plurality of radially extendable and retractable and vertically movable chucks, each having a sector mounted thereto, at a location at which the sectors are disposed radially inwardly of an upper bead portion of a green tire and below the upper bead ring;

extending the chucks radially outwardly such that the sectors mounted thereto are moved into engagement with the upper bead portion and until the upper bead portion is centered relative to the upper bead ring;

raising said vertically movable chucks, once in engagement with the upper bead portion, toward the upper bead ring while the upper bead portion is centered by the sectors relative to the upper bead ring and until the chucks push the upper bead portion into the upper bead ring; and subsequently positioning said plurality of radially extendable and retractable chucks at a location at which the sectors are disposed radially inwardly of a lower bead portion of the green tire and above the lower bead ring, extending the chucks radially outwardly such that the sectors mounted thereto are moved into engagement with the lower bead portion and until the lower bead portion is centered relative to the lower bead ring, and lowering said vertically movable chucks, once in engagement with the lower bead portion, toward the lower bead ring while the lower bead portion is centered relative to the lower bead ring and until the chucks push the lower bead portion into the lower bead ring.

2. In a vulcanizing machine having an upper mold portion including an upper bead ring and a lower mold portion including a lower bead ring, apparatus for inserting a green tire in the machine, said apparatus comprising:

a plurality of radially extendable and retractable and vertically movable chucks each having a sector mounted thereto, said chucks being positionable in the apparatus at first locations at which the sectors mounted thereto are disposed radially inwardly of an upper bead portion of a green tire supported in the machine, and said chucks also being positionable at second locations at which the sectors mounted thereto are disposed radially inwardly of a lower bead portion of a green tire supported in the machine;

extending/retracting means connected to said chucks for selectively radially extending or retracting said chucks, said sectors being extendable radially outwardly from said first or said second locations by said extending/retracting means such that the sectors mounted thereto are moved into engagement with a respective bead portion of the green tire and to positions at which the sectors center the respective bead portion relative to a respective one of the bead rings; and cylinder means connected to said chucks for vertically moving said chucks in the apparatus between said first and said second locations, said cylinder means being operable to selectively position said chucks in engagement with either of the bead portions of the green tire, to move said chucks toward the upper bead ring while the upper bead portion of the green tire is centered relative to the upper bead ring by said sectors and until the chucks push the upper bead portion into the upper bead ring, and to move said chucks toward the lower bead ring while the lower bead portion is centered relative to the lower bead ring by said sectors and until the chucks push the lower bead portion into the lower bead ring.

3. Apparatus in a tire vulcanizing machine as claimed in claim 2, and further comprising springs mounting said sectors to said chucks in a manner in which said sectors are vertically displaceable relative to said chucks.

4. Apparatus in a tire vulcanizing machine as claimed in claim 3, wherein said extending/retracting means comprises a linkage connected to said chucks, said linkage being articulatable to radially extend or retract said chucks and said sectors mounted thereto, and only one chuck opening/closing cylinder connected to said linkage for articulating said linkage to selectively radially extend or retract each of said chucks and said sectors mounted thereto.

* * * * *